(12) United States Patent
Oberoi et al.

(10) Patent No.: US 11,100,191 B2
(45) Date of Patent: Aug. 24, 2021

(54) METHOD AND SYSTEM FOR PERFORMING REAL-TIME ANALYTICS ON A PLURALITY OF DATA STREAMS

(71) Applicant: 1QB INFORMATION TECHNOLOGIES INC., Vancouver (CA)

(72) Inventors: Jaspreet Oberoi, Maple Ridge (CA); Majid Dadashikelayeh, Vancouver (CA); Hedayat Alghassi, Vancouver (CA); Arman Zaribafiyan, Vancouver (CA)

(73) Assignee: 1QB INFORMATION TECHNOLOGIES INC., Vancouver (CA)

( * ) Notice: Subject to any disclaimer, the term of this patent is extended or adjusted under 35 U.S.C. 154(b) by 236 days.

(21) Appl. No.: 16/326,853

(22) PCT Filed: Aug. 25, 2017

(86) PCT No.: PCT/IB2017/055136
§ 371 (c)(1),
(2) Date: Feb. 20, 2019

(87) PCT Pub. No.: WO2018/037388
PCT Pub. Date: Mar. 1, 2018

(65) Prior Publication Data
US 2019/0188238 A1 Jun. 20, 2019

Related U.S. Application Data

(60) Provisional application No. 62/380,135, filed on Aug. 26, 2016.

(51) Int. Cl.
*G06F 7/02* (2006.01)
*G06F 16/00* (2019.01)
(Continued)

(52) U.S. Cl.
CPC ............ *G06F 17/15* (2013.01); *G06F 7/00* (2013.01); *G06F 16/9024* (2019.01);
(Continued)

(58) Field of Classification Search
CPC ...... G06F 17/15; G06F 17/11; G06F 16/9024; G06F 7/00; G06F 17/18; G06N 10/00;
(Continued)

(56) References Cited

U.S. PATENT DOCUMENTS 9,537,953 B1    1/2017  Dadashikelayeh et al.
2006/0028471 A1†  2/2006  Kincaid et al.
(Continued)

FOREIGN PATENT DOCUMENTS

WO    WO 2015/103372 A1    7/2015

OTHER PUBLICATIONS

International Search Report of PCT Application No. PCT/IB2017/055136, dated Dec. 28, 2017.
(Continued)

*Primary Examiner* — Bruce M Moser
(74) *Attorney, Agent, or Firm* — Pearl Cohen Zedek Latzer Baratz LLP

(57) ABSTRACT

A method and system are disclosed for performing real-time analytics on a plurality of data streams, the method comprising obtaining a plurality of data streams; accumulating real-time changes of the obtained plurality of data streams in a buffer unit to provide a buffered data portion; monitoring the buffered data portion for determining a calculation event, wherein the calculation event is based on a strategy based on observing given features in the buffered data portion; upon detection of the calculation event, generating an optimization problem indicative of the real-time analytics to be performed on one of given data portions of the plurality of data streams and a data structure generated using given data (Continued)

portions of the plurality of data streams; transforming the generated optimization problem into an optimization problem suitable for an optimization oracle; providing the transformed generated optimization problem to the optimization oracle; obtaining at least one solution from the optimization oracle; translating the at least one solution and providing the translated at least one solution to thereby provide the real-time analytics on the plurality of data streams.

25 Claims, 9 Drawing Sheets

(51) Int. Cl.
  G06F 17/15 (2006.01)
  G06N 10/00 (2019.01)
  G06F 7/00 (2006.01)
  G06F 17/18 (2006.01)
  G06Q 10/06 (2012.01)
  G06Q 50/00 (2012.01)
  G06N 5/00 (2006.01)
  G06F 16/901 (2019.01)
(52) U.S. Cl.
  CPC ............ *G06F 17/18* (2013.01); *G06N 5/003* (2013.01); *G06N 10/00* (2019.01); *G06Q 10/063* (2013.01); *G06Q 10/067* (2013.01); *G06Q 50/01* (2013.01)

(58) Field of Classification Search
  CPC ...... G06N 5/003; G06Q 10/04; G06Q 10/063; G06Q 10/067; G06Q 50/01
  See application file for complete search history.

(56) References Cited

U.S. PATENT DOCUMENTS

| 2011/0264663 | A1 | | 10/2011 | Verkasalo |
| 2012/0002733 | A1 | | 1/2012 | Misra et al. |
| 2012/0130940 | A1 | † | 5/2012 | Gattani et al. |
| 2013/0034157 | A1 | | 2/2013 | Helle et al. |
| 2014/0297247 | A1 | † | 10/2014 | Troyer et al. |
| 2015/0006443 | A1 | † | 1/2015 | Rose et al. |
| 2016/0071018 | A1 | | 3/2016 | Hernandez et al. |
| 2017/0140295 | A1 | † | 5/2017 | Bandara |
| 2018/0267937 | A1 | † | 9/2018 | Pelc et al. |
| 2019/0370690 | A1 | * | 12/2019 | Anderson .............. G06N 20/10 |

OTHER PUBLICATIONS

Deza, Elena, and Michael Deza, Dictionary of Distances, Elsevier B.V., 2006.
Examination Report for Canadian Patent Application No. 3,034,203, dated Mar. 10, 2020.

\* cited by examiner
† cited by third party

METHOD AND SYSTEM FOR PERFORMING REAL-TIME ANALYTICS ON A PLURALITY OF DATA STREAMS

CROSS-REFERENCE TO RELATED APPLICATION

The present patent application is a National Phase Application of PCT International Application No. PCT/IB2017/055136, International Filing Date Aug. 25, 2017, which claims the benefit of U.S. Provisional Patent Application No. 62/380,135, filed on Aug. 26, 2016, the subject matter of which is incorporated herein by reference.

FIELD

The invention relates to computers. More precisely, the invention pertains to a method and system for performing real-time analytics on a plurality of data streams.

BACKGROUND

Real-time analytics consists of dynamic analysis and reporting within one minute of the data being entered into the system.

In fact, the term analytics in general is used to define data patterns that provide meaning to a business or other entity and allows analysts to collect valuable information by studying and interpreting those patterns.

Graph analytics, built on the mathematics of graph theory, may be used to model for instance pairwise relationships between people, objects, or any kind of nodes in a network. Being able to look at the data through different analytic lenses, such as a graph, is useful for unstructured, constantly changing data because it gives users information and context about relationships in a network and deeper insights that improve the accuracy of predictions and decision-making.

For example, it may be possible to determine a contextual impact of the data to a business as in, how all the data elements that we are gathering from multiple applications and sources (e.g., CRM, ERP, logistics software, sales, IoT, weather, government, social media, etc.) interrelate and impact the business.

In particular, it may be possible to discover the impact of events and their relationship to a business. Graph theory can help acquire intuition and insight that might not be achievable by a human on its own.

In social or informational systems, graph analytics might be used to compare financial trade data with social, geographic, and other data, or to find patterns across varied data sets that signal the onset of cyber-attacks.

It might be applied to social media to enrich the customer view with patterns and relationships, or to detect patterns in communication that might indicate a threat to national defense.

Graph techniques may be used to identify "centralities," such as items or events that lie at the root of other surrounding events or patterns. In social media, this has tremendous application for finding the "influencers," the people who actually start the trends and shape opinions that affect a brand.

Unfortunately, such prior-art methods suffer from many drawbacks.

For instance, a first drawback of those prior methods is that graph analysis is in general computationally complex. Therefore, conventional real-time approaches have to sacrifice quality of analysis in order to compute the results in real-time.

Another drawback of those prior-art methods is that plurality of streaming data normally requires large amount of memory space. This means every iteration of the analysis is happening on a huge data structure.

There is a need for a method and system for implementing the method that will overcome at least one of the above-identified drawbacks.

Features of the invention will be apparent from review of the disclosure, drawings and description of the invention below.

BRIEF SUMMARY

According to a broad aspect, there is disclosed a method for performing real-time analytics on a plurality of data streams, the method comprising obtaining a plurality of data streams using a digital computer; accumulating, using the digital computer, real-time changes of the obtained plurality of data streams in a buffer unit to provide a buffered data portion; monitoring, using the digital computer, the buffered data portion for determining a calculation event, wherein the calculation event is based on a strategy based on observing given features in the buffered data portion; upon detection of the calculation event, generating, using the digital computer, an optimization problem indicative of the real-time analytics to be performed on one of given data portions of the plurality of data streams and a data structure generated using given data portions of the plurality of data streams; transforming, using the digital computer, the generated optimization problem into an optimization problem suitable for an optimization oracle; solving the transformed generated optimization problem using the optimization oracle to provide at least one solution; translating, using the digital computer, the at least one solution and providing, using the digital computer, the translated at least one solution to thereby provide the real-time analytics on the plurality of data streams.

According to an embodiment, the optimization oracle comprises a quantum annealer.

According to an embodiment, the optimization oracle comprises a digital annealer.

According to an embodiment, the optimization oracle comprises a coherent Ising machine.

According to an embodiment, the plurality of data streams obtained comprise time series signals.

According to an embodiment, the plurality of data streams is obtained from a corresponding plurality of data sources.

According to an embodiment, each data source of the plurality of data sources is one of a real-time data source and a non-real-time data source.

According to an embodiment, at least one of the plurality of data sources are located in the digital computer.

According to an embodiment, at least one of the plurality of data sources are located in a remote digital computer operatively connected to the digital computer.

According to an embodiment, the buffer unit is located in the digital computer.

According to an embodiment, the optimization problem indicative of the real-time analytics to be performed is generated on a data structure; the data structure comprises a graph generated using the given data portions of the plurality of data streams, wherein each node of the generated graph is associated with a data stream and each edge of the generated graph is representative of a similarity and distance measure between two respective given data portions of the data streams, further wherein the graph is generated in real-time using computations performed for previous data portions of the plurality of data streams.

According to an embodiment, the plurality of data streams are real-valued data streams.

According to an embodiment, the similarity and distance measure is selected from a group consisting of a Pearson correlation, a Cross correlation similarity calculated in time or frequency domain, a Correlation distance, a Pearson distance, a Covariance similarity, a Cosine similarity, an Angular semi-metric, an Orloci distance, a Similarity ratio, a Morisita-Horn similarity, a Spearman rank correlation, a Spearman footrule distance, a Kendal τ rank correlation, a Kendal τ distance, a Cook distance, a Fross correlation, an Euclidean distance, a L2 norm, a Binary Euclidean distance, a Mean censored Euclidean distance, a Manhattan distance, a L1 norm, a Penrose size distance, a Penrose shape distance, a Lorentzian distance, a Chebyshev distance, a L∞ norm, a power(p, r) distance, a weighted power(p, r) distance, a LP distance, a Normalized Lp distance, a Clark distance, a Meehl distance, a Hellinger distance, a Symmetric $x^2$ measure, a Symmetric $x^2$ distance, a Mahalanobis distance, a Minkowski distance, a Peak signal delay measure, a Time delay of arrival measure, an Absolute value of difference of peak of data, a Correlation of envelope of data, a Ruzicka similarity, a Roberts similarity, an Ellenberg similarity, a Gleason similarity, an Intersection distance, a Bray-Curtis distance, a Canberra distance, a Kulczynski similarities (1,2) and a Baroni-Urbani-Buser similarity.

According to an embodiment, the plurality of data streams are binary-valued data streams.

According to an embodiment, the similarity and distance measure is selected from a group consisting of a Hamann similarity, a Rand similarity, a Sokal-Mitchener similarity, a Sokal-Sneath similarities (1,2,3), a Russel-Rao similarity, a Simpson similarity, a Braun-Blanquet similarity, a Roger-Tanimoto similarity, a Faith similarity, a Tversky similarity, a Gower-Legendre similarity, a Anderberg similarity, a Yule Q similarity, a Yule Y similarity of colligation, a Dispersion similarity, a Pearson φ similarity, a Gower similarity 2, a Pattern difference, a $Q_0$-difference, a Tanimoto similarity, a Tanimoto (biotope) distance, a Ochiai-Otuska similarity, a Jaccard similarity of community, a Motyka similarity, a Bray-Curtis similarity, a Dice similarity, a Czekanowsky-Dice distance.

According to an embodiment, the method further comprises using at least one selected threshold on each edge of the generated graph for providing a binarized graph; further wherein the optimization problem is generated using the binarized graph.

According to an embodiment, two selected thresholds are used and the two selected thresholds comprise a fixed lower threshold value and a fixed upper threshold.

According to an embodiment, the generated optimization problem is transformed into a quadratic unconstrained binary optimization problem.

According to an embodiment, the solving of the transformed optimization problem is performed using the optimization oracle and at least one previous solution.

According to an embodiment, the real-time analytics to be performed is selected from a group consisting of a graph coloring problem, a vertex cover problem, a maximum clique problem, a graph partitioning problem, a maximum independent set and a clique cover.

According to an embodiment, the providing of the translated at least one solution comprises displaying the at least one translated solution to a user.

According to an embodiment, the providing of the translated at least one solution comprises providing the at least one translated solution to a remote processing unit operatively coupled to the digital computer.

According to a broad aspect, there is disclosed a digital computer comprising a central processing unit; a display device; a communication port for operatively connecting the digital computer to an optimization oracle comprising a quantum processor; a memory unit comprising an application for performing real-time analytics on a plurality of data streams, the application comprising instructions for obtaining a plurality of data streams; instructions for accumulating real-time changes of the obtained plurality of data streams in a buffer unit to provide a buffered data portion; instructions for monitoring the buffered data portion for determining a calculation event, wherein the calculation event is based on a strategy based on observing given features in the buffered data portion; instructions for generating, upon detection of the calculation event, an optimization problem indicative of the real-time analytics to be performed on one of given data portions of the plurality of data streams and a data structure generated using given data portions of the plurality of data streams; instructions for transforming the generated optimization problem into an optimization problem suitable for an optimization oracle; instructions for transmitting the transformed generated optimization problem to the optimization oracle; instructions for obtaining from the optimization oracle at least one solution of the transformed optimization problem; instructions for translating the at least one solution and instructions for providing the translated at least one solution to thereby provide the real-time analytics on the plurality of data streams.

According to a broad aspect, there is disclosed a non-transitory computer readable storage medium for storing computer-executable instructions which, when executed, cause a digital computer to perform a method for performing real-time analytics on a plurality of data streams, the method comprising obtaining a plurality of data streams; accumulating real-time changes of the obtained plurality of data streams in a buffer unit to provide a buffered data portion; monitoring the buffered data portion for determining a calculation event, wherein the calculation event is based on a strategy based on observing given features in the buffered data portion; upon detection of the calculation event, generating an optimization problem indicative of the real-time analytics to be performed on one of given data portions of the plurality of data streams and a data structure generated using given data portions of the plurality of data streams; transforming the generated optimization problem into an optimization problem suitable for an optimization oracle; transmitting the transformed generated optimization problem to the optimization oracle; obtaining from the optimization oracle at least one solution of the transformed generated optimization problem; translating the at least one solution and providing the translated at least one solution to thereby provide the real-time analytics on the plurality of data streams.

According to a broad aspect, there is disclosed a method for performing real-time analytics on a plurality of data streams, the method comprising obtaining a plurality of data streams; accumulating real-time changes of the obtained plurality of data streams in a buffer unit to provide a buffered data portion; monitoring the buffered data portion for determining a calculation event, wherein the calculation event is based on a strategy based on observing given features in the buffered data portion; upon detection of the calculation event, generating an optimization problem indicative of the real-time analytics to be performed on one of given data portions of the plurality of data streams and a data structure generated using given data portions of the plurality of data streams; transforming the generated optimization problem into an optimization problem suitable for an optimization oracle; providing the transformed generated optimization problem to the optimization oracle; obtaining at least one solution from the optimization oracle; translating the at least one solution and providing the translated at least one solution to thereby provide the real-time analytics on the plurality of data streams.

An advantage of the method disclosed herein is that the quality of the analysis is not sacrificed since feedback loops and optimization oracle are used.

Another advantage of the method disclosed herein is that it looks at a much smaller data structure for the same type of analysis than prior-art methods since only the differences between successive data points are considered.

Another advantage of the method disclosed is that it improves the operation of a system for performing real-time analytics on a plurality of data streams.

BRIEF DESCRIPTION OF THE DRAWINGS

In order that the invention may be readily understood, embodiments of the invention are illustrated by way of example in the accompanying drawings.

Figure 1A:
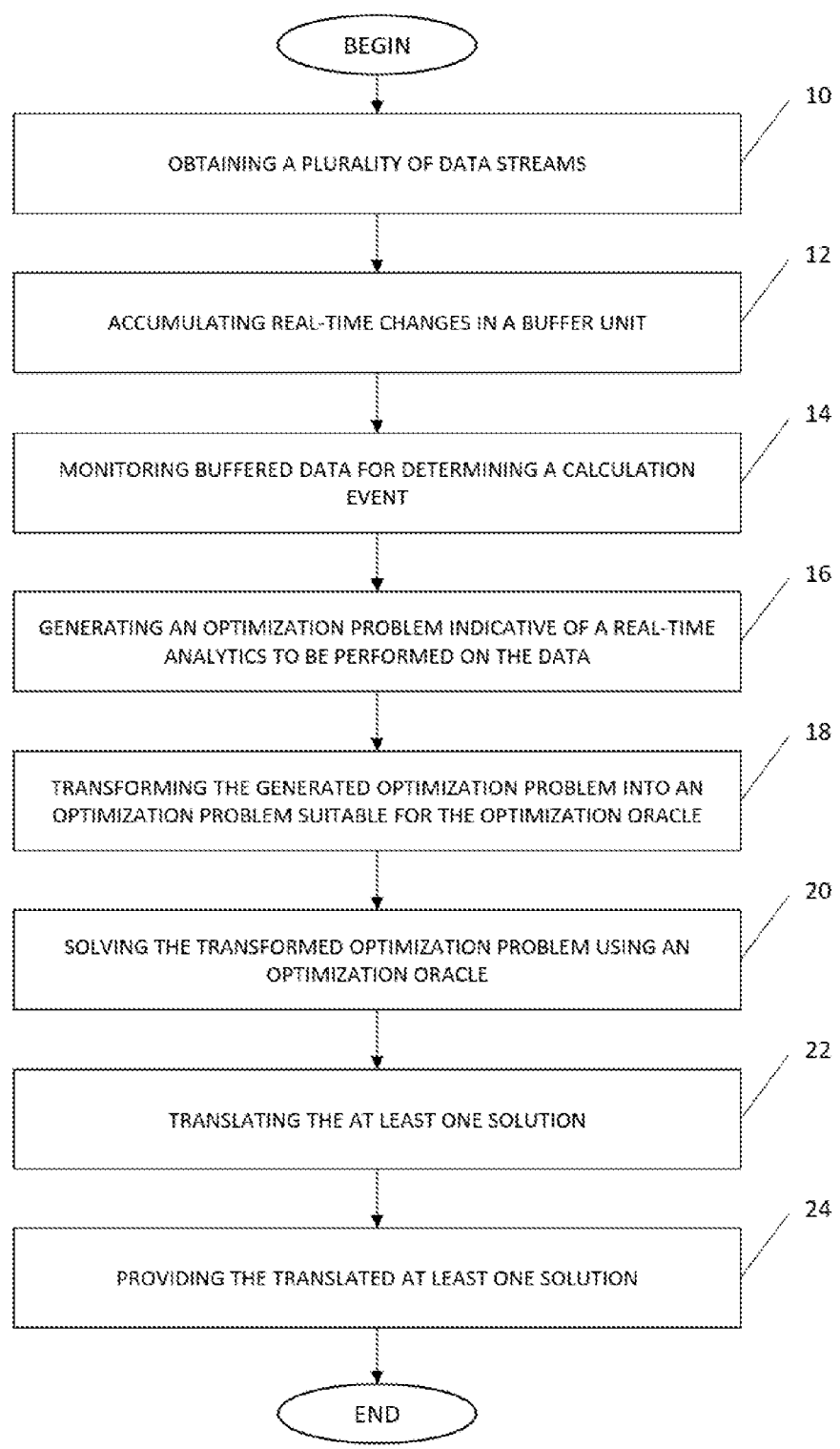
FIG. 1a is a flowchart that shows a first embodiment of a method for performing real-time analytics on a plurality of data streams.

Further details of the invention and its advantages will be apparent from the detailed description included below.

DETAILED DESCRIPTION

In the following description of the embodiments, references to the accompanying drawings are by way of illustration of an example by which the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus do not limit the terms or phrases they explain.

The term "i.e." and like terms mean "that is," and thus limit the terms or phrases they explain.

Neither the Title nor the Abstract is to be taken as limiting in any way as the scope of the disclosed invention(s). The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention (s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

With all this in mind, the present invention is directed to a method for performing real-time analytics on a plurality of data streams and a system for performing real-time analytics on a plurality of data streams.

It will be appreciated that the method and the system disclosed herein may be advantageously used for instance in applications involving multivariable anomaly detection of time series signals.

In fact, real-time optimization can play an important role in applications like multivariate anomaly detection of time series signals.

More precisely, in any anomaly detection system, a model is first designed and trained with a non-anomalous set of data. The parameters of such model designate a normal operation. Later at least one measure of disparity will evaluate the distance of the real-time data's model parameters with the non-anomalous parameters. If the parameter differences are far from a defined norm, the anomaly is detected with a rate in accordance with the disparity measure. In the method disclosed herein, a moving average of parameters of the model (solution of quadratic unconstrained binary optimization problem in accordance with model) can be easily acquired and compared with the instantaneous solution. High difference may be an indicator of anomaly in the current, temporal, instance of input data, i.e., multivariate time series. It will be appreciated that the specific definition of the disparity measure depends on the quadratic unconstrained binary optimization problem model and varies from problem to problem.

For instance, an application of the method disclosed herein may be with the analysis in sleep mode of multichannel electroencephalogram signals acquired from brain waves. Sleep spindles or REM-based sleep signals may be tracked depending on detection algorithms and preprocessing. Depending on the type of processed signals, finding the set of correlated, or non-correlated, channels may lead to quadratic unconstrained binary optimization problem models that search multiple cliques, or independent sets, of the signal channels. The number of cliques, or independent sets, and their cardinality, or more complex their connectivity, may be monitored as model parameters during a longer window. Any change in one's dream or sleep phase may produce instantaneous change in the number and/or cardinality, or connectivity/topology, of cliques, or independent sets, and is an indicator for electroencephalogram anomaly. The skilled addressee will appreciate that the interpretations of anomalies are then the specialist's responsibility.

Figure 2:
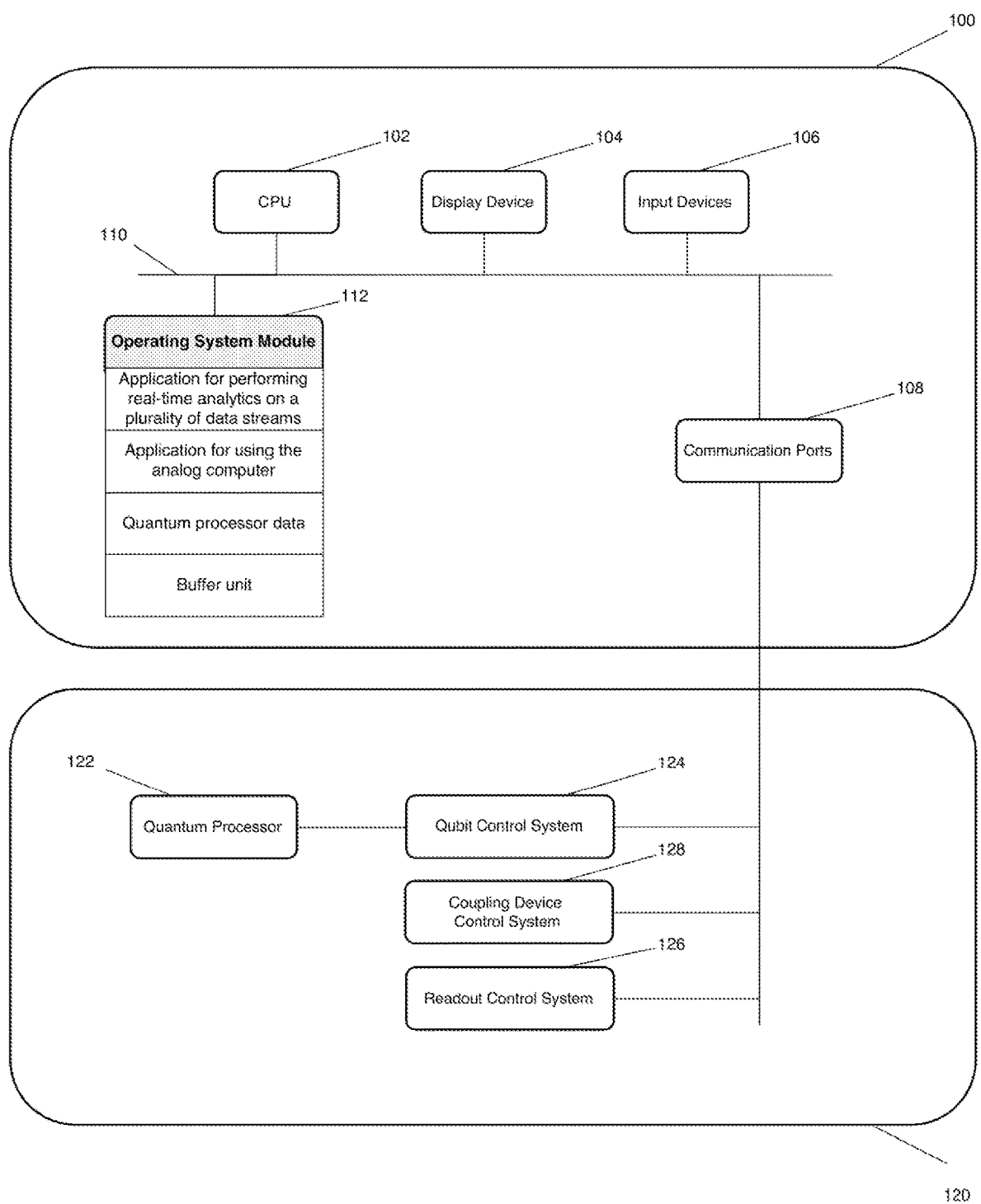
FIG. 2 is a block diagram that shows an embodiment of a system which may be used to implement a method for performing real-time analytics on a plurality of data streams.

Now referring to FIG. 2, there is shown an embodiment of a system that may be used for implementing a method for performing real-time analytics on a plurality of data streams.

More precisely, the system comprises a digital computer 100 coupled to an optimization oracle 120 which is in one embodiment, disclosed herein, an analog computer. It will be appreciated that in an alternative embodiment, the optimization oracle 120 comprises a quantum annealer. It will be appreciated that in another alternative embodiment, the optimization oracle 120 comprises a digital annealer. In another alternative embodiment, the optimization oracle 120 comprises a coherent Ising machine.

It will be appreciated that the digital computer 100 may be any type of digital computer.

In one embodiment, the digital computer 100 is selected from a group consisting of desktop computers, laptop computers, tablet PC's, servers, smartphones, etc. It will also be appreciated that, in the foregoing, the digital computer 100 may also be broadly referred to as a processor.

In the embodiment shown in FIG. 2, the digital computer 100 comprises a central processing unit 102, also referred to as a microprocessor, a display device 104, input devices 106, communication ports 108, a data bus 110 and a memory 112.

The central processing unit 102 is used for processing computer instructions. The skilled addressee will appreciate that various embodiments of the central processing unit 102 may be provided.

In one embodiment, the central processing unit 102 comprises a CPU Core i5 3210 running at 2.5 GHz and manufactured by Intel™.

The display device 104 is used for displaying data to a user. The skilled addressee will appreciate that various types of display device 104 may be used.

In one embodiment, the display device 104 is a standard liquid crystal display (LCD) monitor.

The input devices 106 are used for inputting data into the digital computer 100.

The communication ports 108 are used for sharing data with the digital computer 100.

The communication ports 108 may comprise, for instance, universal serial bus (USB) ports for connecting a keyboard and a mouse to the digital computer 100.

The communication ports 108 may further comprise a data network communication port such as an IEEE 802.3 port for enabling a connection of the digital computer 100 with the optimization oracle 120, an embodiment of which is an analog computer.

The skilled addressee will appreciate that various alternative embodiments of the communication ports 108 may be provided.

The memory unit 112 is used for storing computer-executable instructions.

The memory unit 112 may comprise a system memory such as a high-speed random access memory (RAM) for storing system control program (e.g., BIOS, operating system module, applications, etc.) and a read-only memory (ROM).

It will be appreciated that the memory unit 112 comprises, in one embodiment, an operating system module.

It will be appreciated that the operating system module may be of various types.

In one embodiment, the operating system module is OS X Yosemite manufactured by Apple™.

The memory unit 112 further comprises an application for performing real-time analytics on a plurality of data streams. The application comprises instructions for obtaining a plurality of data streams. The application further comprises instructions for accumulating real-time changes of the obtained plurality of data streams in a buffer unit to provide a buffered data portion. The application further comprises instructions for monitoring the buffered data portion for determining a calculation event, wherein the calculation event is based on a strategy based on observing given features in the buffered data portion. The application further comprises instructions for generating, upon detection of the calculation event, an optimization problem indicative of the real-time analytics to be performed on one of given data portions of the plurality of data streams and a data structure generated using given data portions of the plurality of data streams. The application further comprises instructions for transforming the generated optimization problem into an optimization problem suitable for an optimization oracle. The application further comprises instructions for transmitting the transformed generated optimization problem to the optimization oracle. The application further comprises instructions for obtaining from the optimization oracle at least one solution of the transformed optimization problem. The application further comprises instructions for translating the at least one solution. The application further comprises instructions for providing the translated at least one solution to thereby provide the real-time analytics on the plurality of data streams.

The memory unit 112 may further comprise an application for using the optimization oracle 120.

The memory unit 112 may further comprise quantum processor data such as a corresponding weight for each coupler of the quantum processor 122 and a corresponding bias for each qubit of the quantum processor 122.

The optimization oracle 120, an embodiment of which is an analog computer, comprises a qubit control system 124, a readout control system 126, a quantum processor 122, and a coupling device control system 128.

The quantum processor 122 may be of various types. In one embodiment, the quantum processor 122 comprises superconducting qubits.

The readout control system 126 is used for reading the qubits of the quantum processor 122. In fact, it will be appreciated that, in order for a quantum processor to be used in the method disclosed herein, a readout system that measures the qubits of the quantum system in their quantum mechanical states is required. Multiple measurements provide a sample of the states of the qubits. The results from the readings are fed to the digital computer 100. The biases of the qubits of the quantum processor 122 are controlled via the qubit control system 124. The couplers are controlled via the coupling device control system.

It will be appreciated that the readout control system 126 may be of various types. For instance, the readout control system 126 may comprise a plurality of dc SQUID magnetometers, each inductively connected to a different qubit of the quantum processor 122. The readout control system 126 may provide voltage or current values. In one embodiment, the dc SQUID magnetometer comprises a loop of superconducting material interrupted by at least one Josephson junction, as is well known in the art.

Figure 1B:
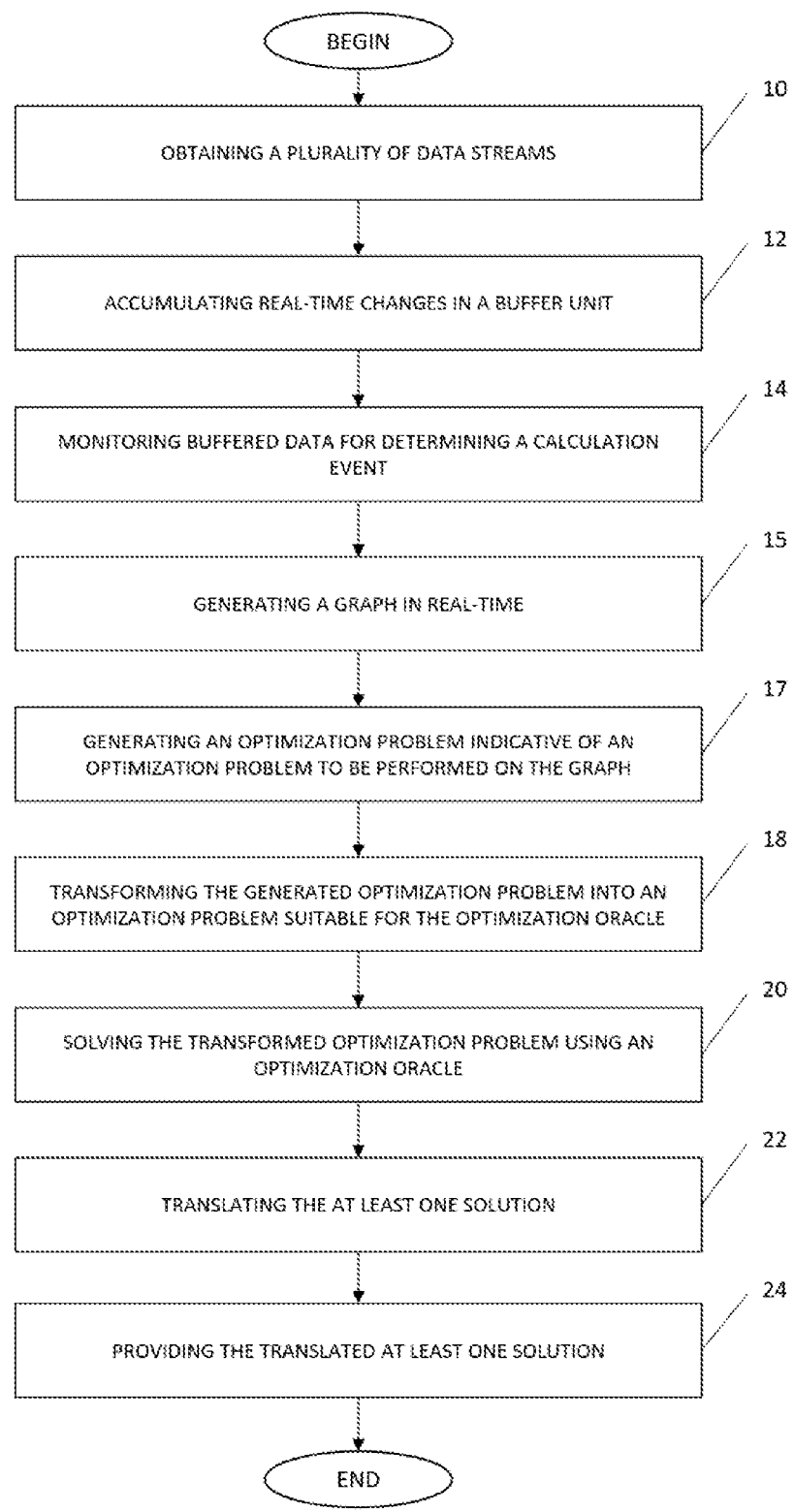
FIG. 1b is a flowchart that shows a second embodiment of a method for performing real-time analytics on a plurality of data streams wherein a graph is generated in real-time.

Now referring to FIG. 1b, there is shown an embodiment of a method for performing real-time analytics on a plurality of data streams. It will be appreciated that the method disclosed in FIG. 1b is one embodiment of the method disclosed in FIG. 1a as further explained below.

According to processing step 10, a plurality of data streams is obtained.

In fact, according to Federal Standard 1037C on "data streaming," a data stream may be defined as a sequence of digitally encoded coherent signals (packets of data or data packets) used to transmit or receive information that is in the process of being transmitted.

It will be appreciated that in one embodiment, the data streams may comprise time series signals, including but not limited to, log files generated by customers or web applications, ecommerce purchases, social network data, financial trading floors, geospatial services, etc. In other embodiments, the data streams may not directly be represented as time series, like the pressure of gas versus volume and other similar examples.

It will be appreciated by the skilled addressee that the plurality of data streams may be obtained according to various embodiments.

In accordance with one embodiment, the plurality of data streams is obtained from a corresponding plurality of data sources. It will be also appreciated that each data source may be one of a real-time and a non real-time data source.

The plurality of data sources may be located within the digital computer 100 or outside of it. For instance, the plurality of data sources may be comprised of a plurality of functions running in the digital computer 100.

In an alternative embodiment, the data sources are generated by at least one remote processing unit, not shown in FIG. 2.

The at least one remote processing unit may be operatively coupled with the digital computer 100 using a data network. The data network may be selected from a group comprising at least one of a local area network (LAN), a metropolitan area (MAN) network and a wide area network (WAN). In one embodiment, the data network comprises the Internet.

The skilled addressee will appreciate that a data stream may have various formats as explained above.

Now referring back to FIG. 1b and according to processing step 12, real-time changes of the obtained plurality of data streams are accumulated in a buffer unit. It will be appreciated that the accumulating of real-time changes of the obtained plurality of data streams provides a buffered data portion.

In fact, it will be appreciated that the purpose of accumulating real-time changes of the obtained plurality of data streams is to later use them to compute a similarity and distance measure between a current data and a previous data as further explained below.

In one embodiment, the buffer unit is located in the memory unit 112 of the digital computer 100.

The skilled addressee will appreciate that the buffer unit may have various sizes depending on parameters such as a tolerable time lag by the user in the analysis, hardware limitations of the digital computer 100 implementing the method disclosed herein, an average size of the input problem in terms of number of variables, an average rate of change in the data stream signals, etc.

The skilled addressee will further appreciate that the buffer unit may be located at various alternative locations.

Still referring to FIG. 1b and according to processing step 14, the buffered data portion is monitored. It will be appreciated that the buffered data portion is monitored for determining a calculation event.

In fact, it will be appreciated that in one embodiment the buffered data portion is monitored using the digital computer 100.

It will be further appreciated that the calculation event is based on a strategy based on observing given features in the buffered data portion.

In one embodiment, the monitoring may be performed on the changes (i.e., addition/deletion) of the edges in a resulting graph from the data streams. When a number of changes exceeds a certain threshold, which may be specified by the user in one embodiment, a calculation process, such as finding a new max clique, is triggered on the new resulting graph.

Still referring to FIG. 1b and according to processing step 15, a graph is generated using given data portions of the plurality of data streams. It will be appreciated that processing step 15 and processing step 17 disclosed herein below are one embodiment of processing step 16 disclosed in FIG. 1a. According to processing step 16 shown in FIG. 1a, an optimization problem indicative of real-time analytics to be performed on the data is generated upon detection of the calculation event. More precisely and as detailed below, the optimization problem is generated on a data structure generated using the given data portions of the plurality of data streams wherein the data structure comprises a graph generated using the given data portions of the plurality of data streams, wherein each node of the generated graph is associated with a data stream and each edge of the generated graph is representative of a similarity and distance measure between two respective given data portions of the data streams.

As explained above and in this particular embodiment, it will be appreciated that the generated graph comprises a plurality of nodes and a plurality of edges.

More precisely, each node of the generated graph is associated with a data stream and each edge of the generated graph is representative of a similarity and distance measure between two respective given data portions of the data streams.

It will be also appreciated that the generation of the graph is performed in real-time using computations performed for previous data portions of the plurality of data streams.

Figure 3:
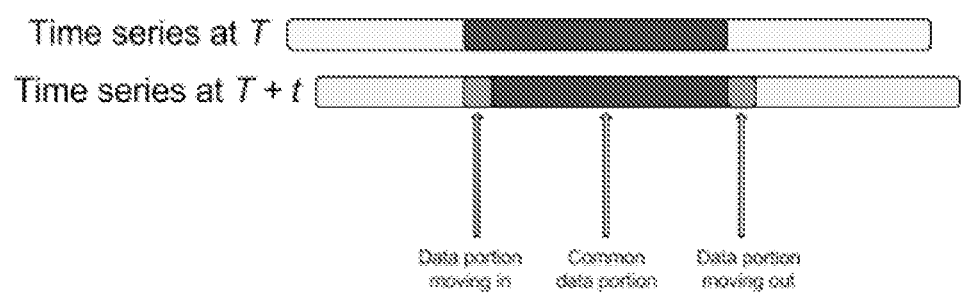
FIG. 3 is a diagram that shows how previous data portions of the plurality of data streams may be advantageously used.

Now referring to FIG. 3, there is illustrated how previous data portions of the plurality of data streams may be used. In fact, it will be appreciated that if at any time "T" a first data window of the time series is used for calculating the similarity and distance measure, then it is possible to see that after a discrete time step of "t," the first data window length staying the same, a data portion moves out of the first window and an equivalent portion of data moves in. A common data portion is left between any two successive similarity and distance measure calculations.

A module may therefore be used for advantageously exploiting the above-mentioned fact and along with using the "feed-backed reusable" common data portion after every time step correlation calculation, it computes the "to be discarded" contribution of the data portion moving out of the window and replaces it with the "to be included" contribution of the equivalent data portion moving in. Such module enables the use of the pre-computed common data portion part at each time step and thus reduces considerable the time needed for calculating the correlation.

Similarity and Distance Measures

The similarity and distance measurement may comprise any method that measures the closeness and affinity of any pair of data streams, e.g., time-series, using various metrics. These closeness measures are generally suffixed by "similarity," "distance," "norm" or "metric." Depending on if the data streams are real-valued or binary-valued, different similarity and distance measures may be used as further explained below.

In the case of real-valued data streams ($R^n$), the similarity and distance measure may be selected from a group consisting of a Pearson correlation, a Cross correlation similarity (calculated in time or frequency domain), a Correlation distance, a Pearson distance, a Covariance similarity, a Cosine similarity, an Angular semi-metric, an Orloci distance, a Similarity ratio, a Morisita-Horn similarity, a Spearman rank correlation, a Spearman footrule distance, a Kendal τ rank correlation, a Kendal τ distance, a Cook distance, a Fross correlation, an Euclidean distance, a L2 norm, a Binary Euclidean distance, a Mean censored Euclidean distance, a Manhattan distance, a L1 norm, a Penrose size distance, a Penrose shape distance, a Lorentzian distance, a Chebyshev distance, a L∞ norm, a power(p, r) distance, a weighted power(p, r) distance, a LP distance, a Normalized Lp distance, a Clark distance, a Meehl distance, a Hellinger distance, a Symmetric $x^2$ measure, a Symmetric $x^2$ distance, a Mahalanobis distance, a Minkowski distance, a Peak signal delay measure, a Time delay of arrival measure, an Absolute value of difference of peak of data, a Correlation of envelope of data, a Ruzicka similarity, a Roberts similarity, an Ellenberg similarity, a Gleason similarity, an Intersection distance, a Bray-Curtis distance, a Canberra distance, a Kulczynski similarities (1,2), a Baroni-Urbani-Buser similarity.

In the case of binary-valued data streams ({0, 1}" or {−1, 1}"), the similarity and distance measure may be selected from a group consisting of a Hamann similarity, a Rand similarity, a Sokal-Mitchener similarity, a Sokal-Sneath similarities (1,2,3), a Russel-Rao similarity, a Simpson similarity, a Braun-Blanquet similarity, a Roger-Tanimoto similarity, a Faith similarity, a Tversky similarity, a Gower-Legendre similarity, a Anderberg similarity, a Yule Q similarity, a Yule Y similarity of colligation, a Dispersion similarity, a Pearson φ similarity, a Gower similarity 2, a Pattern difference, a $Q_0$-difference, a Tanimoto similarity, a Tanimoto (biotope) distance, a Ochiai-Otuska similarity, a Jaccard similarity of community, a Motyka similarity, a Bray-Curtis similarity, a Dice similarity, a Czekanowsky-Dice distance.

The skilled addressee will appreciate that information on the similarity and distance measures may be found in the Dictionary of Distances authored by M.-M. Deza and E. Deza and published by Elsevier (2006).

In one embodiment, any of the above-mentioned similarity and distance measures may be used as is to generate a weighted or binary graph. It will be appreciated that in another embodiment, any of the above-mentioned similarity and distance measures may be applied to fixed or variable sized windows of input data stream, binary or real. It will be appreciated that they may be averaged successively in time or indices, or moving averaged, in order to reduce the calculation cost of larger frames of data streams. It will be appreciated that the windowed average values may then be used to generate a weighted or binary graph as disclosed above.

It will be appreciated that in one embodiment, all pairs of similarity and distance measures, which are real-valued, may be used to generate a weighted graph wherein each node of the graph is associated with a data stream and each edge is representative of similarity and distance measure between two data streams. In another embodiment, all pairs of similarity and distance measures are binarized, by using one selected threshold value, to create corresponding binary graphs. In another embodiment, all pairs of similarity and distance measures are binarized, by using two fixed upper threshold and lower threshold values, to create corresponding binary graphs.

An embodiment of similarity and distance measure calculation is moving averaged Pearson correlation and is disclosed herein below.

Two time series X and Y with corresponding elements represented by $x_i$ and $y_i$ are considered. Each element represents the value of the series at a time instant i. For the purpose of illustration, there is assumed an equal number of elements in both series. If the total length of the series is given to be N, the Pearson correlation coefficient is calculated as:

$$r_{xy}^N = \left( \sum_{i=1}^{N} x_i y_i - N\bar{x}\bar{y} \right) \Big/ \sqrt{\left( \sum_{i=1}^{N} x_i^2 - N\bar{x}^2 \right)\left( \sum_{i=1}^{N} y_i^2 - N\bar{y}^2 \right)}.$$

A window having a size n is considered. The window slides forward and successive correlations coefficients are computed. It will be appreciated that sliding the window forward can also be seen as addition of a new measurement, i.e., live information, and subtraction of the oldest measurement. Each such coefficient $r_{xy}^n$ is using n elements from the time series out of which (n−1) elements/time-steps are common between such consecutive coefficients. Avoiding the recomputation of blocks involving these common (n−1) elements and reusing them in the calculation of the successive coefficient is therefore proposed. Coefficients are depicted according to the first element considered in the window, thus $r_{xy}^{n,i}$ would mean the Pearson correlation coefficient of series x and y over the window of size n starting from element i. It will be appreciated that, as the window is slid, the mean values change. The mean values similarly are denoted as $\bar{x}_1$ and $\bar{y}_1$ and so on.

The disclosed method operates as follows: the first coefficient $r_{xy}^{n,1}$ is calculated traditionally since no preceding coefficient calculation blocks are available at the starting point.

$$r_{xy}^{n,1} = \left(\sum_{i=1}^{N} x_i y_i - n\overline{xy}\right) \bigg/ \sqrt{\left(\sum_{i=1}^{n} x_i^2 - n\overline{x}_1^2\right)\left(\sum_{i=1}^{n} y_i^2 - n\overline{y}_1^2\right)}$$

The above equation may be written as:

$$r_{xy}^{n,1} = \left(x_1 y_1 + \sum_{i=2}^{N} x_i y_i - n\overline{xy}\right) \bigg/ \sqrt{\left(x_1^2 + \sum_{i=2}^{n} x_i^2 - n\overline{x}_1^2\right)\left(y_1^2 + \sum_{i=2}^{n} y_i^2 - n\overline{y}_1^2\right)}$$

$$r_{xy}^{n,1} = (A^1 - n\overline{x}_1 \overline{y}_1) \bigg/ \sqrt{(B^1 - n\overline{x}_1^2)(C^1 - n\overline{y}_1^2)}$$

The successive correlation coefficient to be calculated after sliding the window by one time event may be similarly written as:

$$r_{xy}^{n,2} = \left(x_{n+1} y_{n+1} + \sum_{i=2}^{N} x_i y_i - n\overline{x}_2 \overline{y}_2\right) \bigg/$$

$$\sqrt{\left(x_{n+1}^2 + \sum_{i=2}^{n} x_i^2 - n\overline{x}_2^2\right)\left(y_{n+1}^2 + \sum_{i=2}^{n} y_i^2 - n\overline{y}_2^2\right)}$$

$$r_{xy}^{n,2} = (A^2 - n\overline{x}_2 \overline{y}_2) \bigg/ \sqrt{(B^2 - n\overline{x}_2^2)(C^2 - n\overline{y}_2^2)}$$

The following five update equations may be used to calculate $r_{xy}^{n,2}$ from $r_{xy}^{n,1}$:

$$A^2 = A^1 - x_1 y_1 + x_{n+1} y_{n+1}$$

$$B^2 = B^1 - x_1^2 + x_{n+1}^2$$

$$C^2 = C^1 - y_1^2 + y_{n+1}^2$$

$$\overline{x}_2 = \overline{x}_1 + (x_{n+1} - x_1)/n$$

$$\overline{y}_2 = \overline{y}_1 + (y_{n+1} - y_1)/n$$

So, once $A^1$, $B^1$, $C^1$, $\overline{x}_1$, $\overline{y}_1$ are calculated from the first initial step of correlation computation, the calculation for the successive correlation involves minor updates and the method carries on. It will be appreciated by the skilled addressee that this updating rule may be generalized as below:

$$A^{m+1} = A^m - x_m y_m + x_{n+m} y_{n+m}$$

$$B^{m+1} = B^m - x_m^2 + x_{n+m}^2$$

$$C^{m+1} = C^m - y_m^2 + y_{n+m}^2$$

$$\vec{x}_{m+1} = \vec{x}_m + (x_{n+m} - x_m)/n$$

$$\vec{y}_{m+1} = \vec{y}_m + (y_{n+m} - y_m)/n$$

It will therefore be appreciated that this may be of great advantage for saving computational resources.

Still referring to FIG. 1b and according to processing step 18, an optimization problem indicative of the real-time analytics to be performed on the generated graph is generated upon detection of the calculation event.

In one embodiment, the optimization problem indicative of the real-time analytics to be performed on the generated graph is generated using the digital computer 100. It will be appreciated that, in one embodiment, the optimization problem indicative of the real-time analytics to be performed on the generated graph comprises a quadratic unconstrained binary optimization problem. It will be appreciated that the quadratic unconstrained binary optimization problem may be readily solved using the optimization oracle.

It will be appreciated that the optimization problem is dependent on the optimization problem to be performed, also referred to as the real-time analytics to be performed as explained above.

For instance, the optimization problem to be performed may be selected from a group consisting of a graph coloring problem, a vertex cover problem, a maximum clique problem, a graph partitioning problem, a maximum independent set and a clique cover.

Now referring back to FIG. 1b and according to processing step 20, the generated optimization problem is transformed into an optimization problem suitable for the optimization oracle.

Still referring to FIG. 1b and according to processing step 22, the transformed optimization problem is solved using an optimization oracle to provide at least one solution.

It will be appreciated that in the embodiment where the optimization problem is a quadratic unconstrained binary optimization problem, and where the optimization oracle is a quantum annealer, no transformation is required since the quadratic unconstrained binary optimization problem can be solved by the optimization oracle. It will be appreciated that the quadratic unconstrained binary optimization problem is solved using the analog computer 120 to provide at least one solution.

Given a quadratic unconstrained binary optimization problem, the at least one solution is provided by the quantum annealer. Having solved an optimization problem, the computational effort of solving another closely related optimization problem may, in general, be reduced if one can properly take advantage of the information gained during the course of the solution of the original problem. This can be referred to as a "warm-start strategy."

In fact, if a quantum annealer is used for solving an optimization problem represented by a quadratic unconstrained binary optimization problem Q1, the solution S1 of this quadratic unconstrained binary optimization problem may be used for effectively solving another quadratic unconstrained binary optimization problem Q2 given that the quadratic unconstrained binary optimization problems Q1 and Q2 are closely related.

It will be appreciated that a module located in the digital computer 100 may therefore be used in one embodiment for identifying a relationship between the two quadratic unconstrained binary optimization problems and for calculating the appropriate warm start provided to the quadratic unconstrained binary optimization problem Q2. Such module helps to reduce an optimization time needed for successive quadratic unconstrained binary optimization problems once an optimal solution to the primary quadratic unconstrained binary optimization problem has been found.

An important benefit is to reuse the information from previous steps of an ongoing optimization to speed up the next steps.

It will be appreciated by the skilled addressee that one of the recurring steps in optimization by quantum annealers is minor embedding.

In fact, minor embedding is the process of mapping a problem on to the architecture of a quantum annealer. This process is a computationally expensive step after a problem is reduced into a quadratic unconstrained binary optimization problem and before it is solved on the hardware chip. The terms and variables of a quadratic unconstrained binary optimization problem can be represented as a graph, i.e., quadratic unconstrained binary optimization problem graph, and the architecture of the quantum annealing chip may be represented as a hardware graph as well. Minor embedding is the process of mapping the former into the latter. It will be appreciated by the skilled addressee that there may be several heuristic methods that are used to solve minor embedding. These heuristics methods may benefit from providing the initial state of the embedding in two ways: i.e., with a warm start for local search heuristics and with virtual embedding.

Warm Start for Local Search Heuristics

Local search heuristic methods, like simulated annealing, may be used to start from an original embedding and change the embedding to go towards another feasible embedding. These methods can make small local modifications to an embedding while trying to minimize the number of features that make an embedding infeasible. An embedding found for a previous step of an optimization is not necessarily a feasible embedding for a step afterwards. However, it may possibly be a suitable starting point provided to the local search heuristic responsible for finding the embedding making the minor embedding process faster.

Virtual Embedding

Part of the result of a minor embedding process consists of a list of destination graph nodes that need to be merged to form logical destination graph nodes. If an embedding is already found for an input graph close to the input graph we are trying to solve the minor embedding problem for, the previously found embedding may be used in order to make the process simpler. This may be achieved by applying the embedding found on the destination graph and therefore getting a logical graph that is an easier target for the embedding process. Once the embedding is found from the input graph to the logical destination graph, it can be simply mapped to the embedding from the input graph to the actual destination graph.

Figure 4:
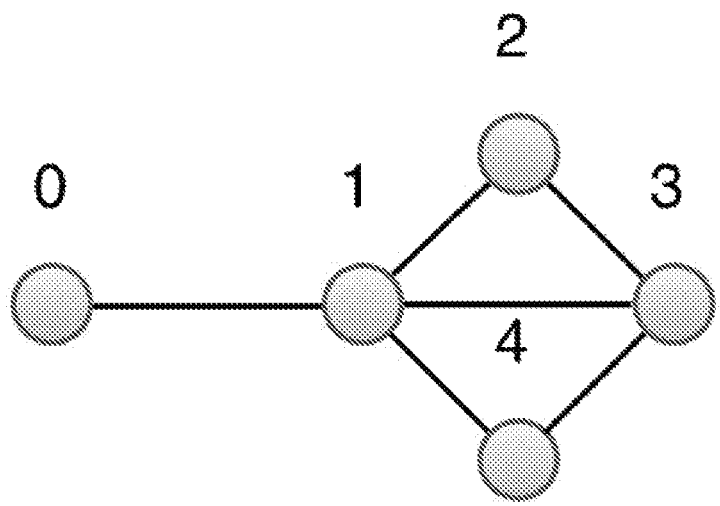
FIG. 4 is a diagram that shows an embodiment of an input graph of an example problem.

Now referring to FIG. 4, there is illustrated an embodiment of an input graph of an example problem. The problem of finding the maximum clique on this example graph can be formulated as the following quadratic unconstrained binary optimization problem:

$$\min_{q} -q_0 - q_1 - q_2 - q_3 - q_4 + 1.1q_0q_3 + 1.1q_0q_2 + 1.1q_0q_4 + 1.1q_2q_4$$

Figure 5:
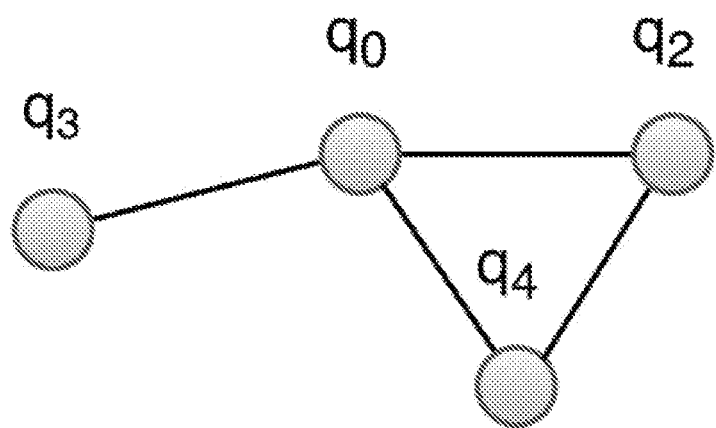
FIG. 5 is a diagram that shows a graph representation of the quadratic unconstrained binary optimization problem for the example problem of FIG. 4.

Now referring to FIG. 5, there is shown a graph representation of the quadratic unconstrained binary optimization problem.

Figure 6:
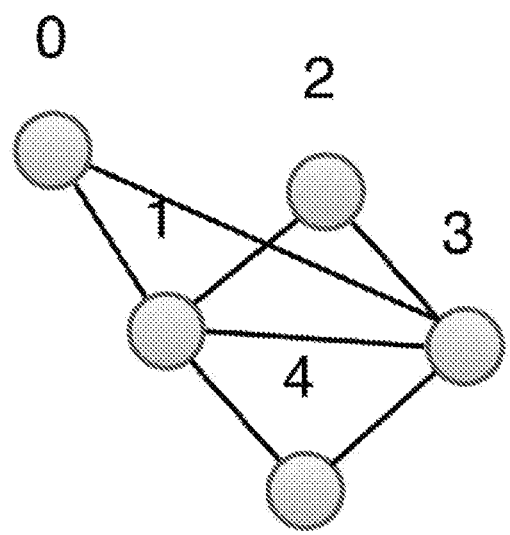
FIG. 6 is a diagram that shows the input graph of the example problem in which one extra edge is added.
Figure 7:
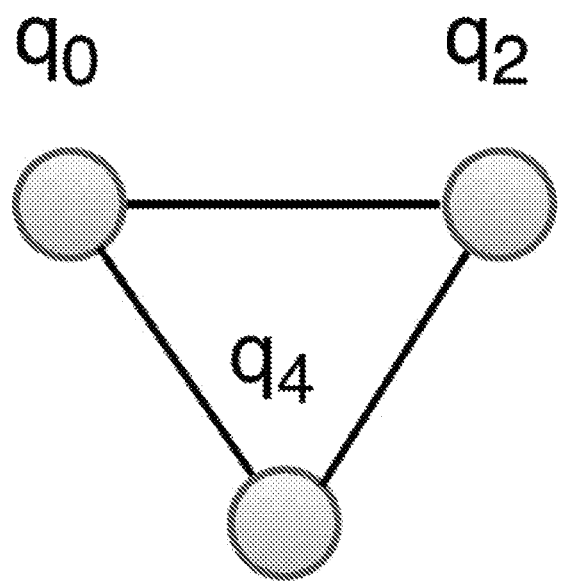
FIG. 7 is a diagram that shows a corresponding quadratic unconstrained binary optimization problem graph for the input graph of FIG. 6.

In FIG. 6, the input graph is amended by adding one extra edge, between node 3 and node 0. The skilled addressee will appreciate that this amendment also changes the corresponding quadratic unconstrained binary optimization problem graph as shown in FIG. 7.

Figure 8:
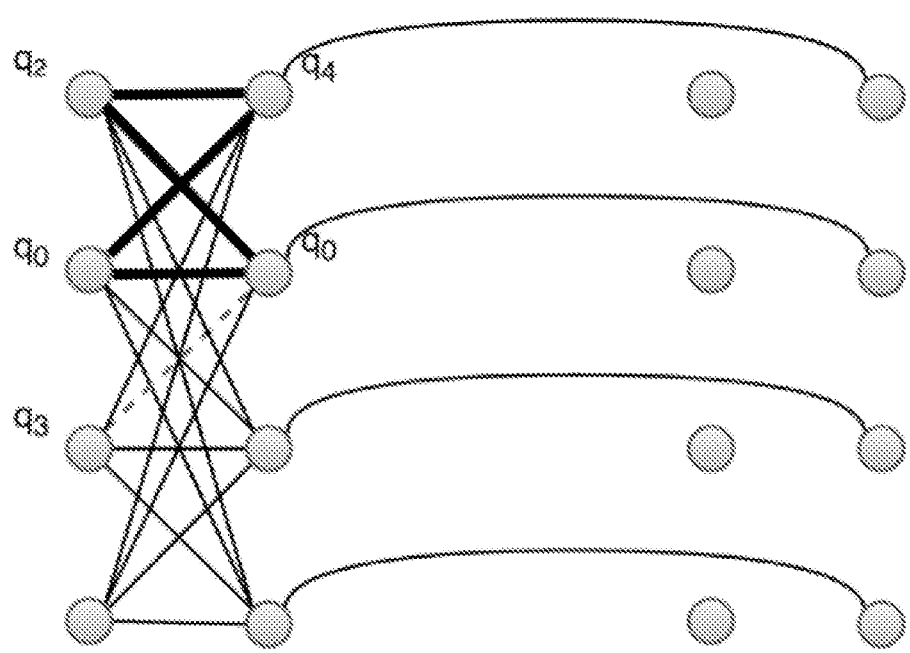
FIG. 8 is a diagram which shows a difference between the embeddings of the two quadratic unconstrained binary optimization problems.

Now referring to FIG. 8, there is shown the difference between the embeddings of the two quadratic unconstrained binary optimization problems.

The circles shown in FIG. 8 are qubits on the quantum annealing chip. The black lines are existing connection on the hardware graph. The bold lines are the resulting embedding of the quadratic unconstrained binary optimization problems on the chip.

It will be appreciated that FIG. 8 shows the embeddings for the first and the second graph (bold lines). More precisely, the first embedding contains the _dashed_coupler on D-Wave while the second graph does not need the coupler. This embodiment illustrates how recalculation of the NP-complete minor embedding for each instance of an involving input is not necessary. It will therefore be appreciated by the skilled addressee that reusing the previous embeddings may save significant amount of computation and is therefore of great advantage.

Optimization Guidance

Similar to the embedding step, the optimization may also benefit from prior knowledge. If information about the solution to a problem that is very similar to the current problem is available, it is possible to study the difference between the two problems and use the known answer to derive the solution to the new optimization problem.

As further disclosed below, there is shown an example of using guidance to solve optimization problems more efficiently using knowledge from the previous similar optimization problems.

Two examples of quadratic unconstrained binary optimization problem polynomials are considered.

Quadratic unconstrained binary optimization problem polynomial 1:

$-q_0 - q_1 - q_2 - 1.1q_0q_1 - 1.1q_0q_2$

Quadratic unconstrained binary optimization problem polynomial 2:

$-q_0 - q_1 - q_2 - 1.1q_0q_1 - 1.1q_0q_2 - 1.1q_1q_2$

If the quadratic unconstrained binary optimization problem polynomial 1 is maximized, the solution S1 is: $q_0 = -1$, $q_1 = 1$, $q_2 = 1$ This solution may be used to solve the quadratic unconstrained binary optimization problem polynomial 2 which differs from the quadratic unconstrained binary optimization problem polynomial 1 by just the term: "$-1.1q_1q_2$".

It will be appreciated that this extra term only has variables $q_1$ and $q_2$ in it. This term is not affected by the value of other variables in the quadratic unconstrained binary optimization problem. It is itself maximised when $q_1$ and $q_2$ keep the same values as in S1. Thus it can be deduced that the quadratic unconstrained binary optimization problem polynomial 2 is also maximised by the same configuration as S1 and thus solution to the quadratic unconstrained binary optimization problem polynomial 2, S2 is: $q_0 = -1$, $q_1 = 1$, $q_2 = 1$.

It will therefore be appreciated that a module may be used for saving computational resources. The module may integrate the incremental minor embedding and the optimization guidance.

Now referring back to FIG. 1b and according to processing step 24, the at least one solution is translated.

In one embodiment, the translation of the at least one solution is performed using the digital computer 100.

In an alternative embodiment, the translation of the at least one solution to the quadratic unconstrained binary optimization problem is performed using another digital computer.

Now referring back to FIG. 1b and according to processing step 26, the translated at least one solution is provided to thereby provide the real-time analytics on the plurality of data streams.

It will be appreciated that the translated at least one solution may be provided according to various embodiments.

In one embodiment, the translated at least one solution is provided to a user. For instance, the translated at least one solution may be displayed using the display device 104 of the digital computer 100.

In an alternative embodiment, the translated at least one solution is provided to a remote processing unit. In one embodiment, the remote processing unit is operatively coupled with the digital computer 100 using at least one data network, not shown.

The at least one data network may be selected from a group consisting of a local area network (LAN), a metropolitan area network (MAN) and a wide area network (WAN). In one embodiment, the data network comprises the Internet.

It will be appreciated that a non-transitory computer readable storage medium is disclosed for storing computer-executable instructions which, when executed, cause a digital computer to perform a method for performing real-time analytics on a plurality of data streams. The method comprises obtaining a plurality of data streams; accumulating real-time changes of the obtained plurality of data streams in a buffer unit to provide a buffered data portion; monitoring the buffered data portion for determining a calculation event, wherein the calculation event is based on a strategy based on observing given features in the buffered data portion; upon detection of the calculation event, generating, using the digital computer, an optimization problem indicative of the real-time analytics to be performed on one of given data portions of the plurality of data streams and a data structure generated using given data portions of the plurality of data streams; transforming the generated optimization problem into an optimization problem suitable for the optimization oracle; transmitting the transformed optimization problem to the optimization oracle; obtaining from the optimization oracle at least one solution of the transformed optimization problem; translating the at least one solution and providing the translated at least one solution to thereby provide the real-time analytics on the plurality of data streams.

Clauses

Clause 1. A method for performing real-time analytics on a plurality of data streams, the method comprising:

obtaining a plurality of data streams using a digital computer;

accumulating, using the digital computer, real-time changes of the obtained plurality of data streams in a buffer unit to provide a buffered data portion;

monitoring, using the digital computer, the buffered data portion for determining a calculation event, wherein the calculation event is based on a strategy based on observing given features in the buffered data portion;

upon detection of the calculation event, generating, using the digital computer, an optimization problem indicative of the real-time analytics to be performed on one of given data portions of the plurality of data streams and a data structure generated using given data portions of the plurality of data streams;

transforming, using the digital computer, the generated optimization problem into an optimization problem suitable for an optimization oracle;

solving the transformed generated optimization problem using the optimization oracle to provide at least one solution;

translating, using the digital computer, the at least one solution; and providing, using the digital computer, the translated at least one solution to thereby provide the real-time analytics on the plurality of data streams.

Clause 2. The method as claimed in clause 1, wherein the optimization oracle comprises a quantum annealer.

Clause 3. The method as claimed in clause 1, wherein the optimization oracle comprises a digital annealer.

Clause 4. The method as claimed in clause 1, wherein the optimization oracle comprises a coherent Ising machine.

Clause 5. The method as claimed in any one of clauses 1 to 4, wherein the plurality of data streams obtained comprise time series signals.

Clause 6. The method as claimed in any one of clauses 1 to 5, wherein the plurality of data streams is obtained from a corresponding plurality of data sources.

Clause 7. The method as claimed in clause 6, wherein each data source of the plurality of data sources is one of a real-time data source and a non real-time data source.

Clause 8. The method as claimed in clause 7, wherein at least one of the plurality of data sources is located in the digital computer.

Clause 9. The method as claimed in clause 7, wherein at least one of the plurality of data sources is located in a remote digital computer operatively connected to the digital computer.

Clause 10. The method as claimed in any one of clauses 1 to 9, wherein the buffer unit is located in the digital computer.

Clause 11. The method as claimed in any one of clauses 1 to 10, wherein the optimization problem indicative of the real-time analytics to be performed is generated on a data structure; further wherein the data structure comprises a graph generated using the given data portions of the plurality of data streams, wherein each node of the generated graph is associated with a data stream and each edge of the generated graph is representative of a similarity and distance measure between two respective given data portions of the data streams, further wherein the graph is generated in real-time using computations performed for previous data portions of the plurality of data streams.

Clause 12. The method as claimed in clause 11, wherein the plurality of data streams are real-valued data streams.

Clause 13. The method as claimed in clause 12, wherein the similarity and distance measure is selected from a group consisting of a Pearson correlation, a Cross correlation similarity calculated in time or frequency domain, a Correlation distance, a Pearson distance, a Covariance similarity, a Cosine similarity, an Angular semi-metric, an Orloci distance, a Similarity ratio, a Morisita-Horn similarity, a Spearman rank correlation, a Spearman footrule distance, a Kendal τ rank correlation, a Kendal τ distance, a Cook distance, a Fross correlation, an Euclidean distance, a L2 norm, a Binary Euclidean distance, a Mean censored Euclidean distance, a Manhattan distance, a L1 norm, a Penrose size distance, a Penrose shape distance, a Lorentzian distance, a Chebyshev distance, a L∞ norm, a power(p, r) distance, a weighted power(p, r) distance, a LP distance, a Normalized Lp distance, a Clark distance, a Meehl distance, a Hellinger distance, a Symmetric $x^2$ measure, a Symmetric $x^2$ distance, a Mahalanobis distance, a Minkowski distance, a Peak signal delay measure, a Time delay of arrival measure, an Absolute value of difference of peak of data, a Correlation of envelope of data, a Ruzicka similarity, a Roberts similarity, an Ellenberg similarity, a Gleason similarity, an Intersection distance, a Bray-Curtis distance, a Canberra distance, a Kulczynski similarities (1,2) and a Baroni-Urbani-Buser similarity.

Clause 14. The method as claimed in clause 11, wherein the plurality of data streams are binary-valued data streams.

Clause 15. The method as claimed in clause 14, wherein the similarity and distance measure is selected from a group consisting of a Hamann similarity, a Rand similarity, a Sokal-Mitchener similarity, a Sokal-Sneath similarities (1,2,3), a Russel-Rao similarity, a Simpson similarity, a Braun-Blanquet similarity, a Roger-Tanimoto similarity, a Faith similarity, a Tversky similarity, a Gower-Legendre similarity, a Anderberg similarity, a Yule Q similarity, a Yule Y similarity of colligation, a Dispersion similarity, a Pearson $\varphi$ similarity, a Gower similarity 2, a Pattern difference, a $Q_0$-difference, a Tanimoto similarity, a Tanimoto (biotope) distance, a Ochiai-Otuska similarity, a Jaccard similarity of community, a Motyka similarity, a Bray-Curtis similarity, a Dice similarity, a Czekanowsky-Dice distance.

Clause 16. The method as claimed in any one of clauses 12 to 13, further comprising using at least one selected threshold on each edge of the generated graph for providing a binarized graph; further wherein the optimization problem is generated using the binarized graph.

Clause 17. The method as claimed in clause 16, wherein two selected thresholds are used, further wherein the two selected thresholds comprise a fixed lower threshold value and a fixed upper threshold.

Clause 18. The method as claimed in any one of clauses 1 to 17, wherein the generated optimization problem is transformed into a quadratic unconstrained binary optimization problem.

Clause 19. The method as claimed in any one of clauses 1 to 18, wherein the solving of the transformed optimization problem is performed using the optimization oracle and at least one previous solution.

Clause 20. The method as claimed in clause 1, wherein the real-time analytics to be performed is selected from a group consisting of a graph coloring problem, a vertex cover problem, a maximum clique problem, a graph partitioning problem, a maximum independent set and a clique cover.

Clause 21. The method as claimed in any one of clauses 1 to 20, wherein the providing of the translated at least one solution comprises displaying the at least one translated solution to a user.

Clause 22. The method as claimed in any one of clauses 1 to 20, wherein the providing of the translated at least one solution comprises providing the at least one translated solution to a remote processing unit operatively coupled to the digital computer.

Clause 23. A digital computer comprising:
 a central processing unit;
 a display device;
 a communication port for operatively connecting the digital computer to an optimization oracle comprising a quantum processor;
 a memory unit comprising an application for performing real-time analytics on a plurality of data streams, the application comprising:
  instructions for obtaining a plurality of data streams;
  instructions for accumulating real-time changes of the obtained plurality of data streams in a buffer unit to provide a buffered data portion;
  instructions for monitoring the buffered data portion for determining a calculation event, wherein the calculation event is based on a strategy based on observing given features in the buffered data portion;
  instructions for generating, upon detection of the calculation event, an optimization problem indicative of the real-time analytics to be performed on one of given data portions of the plurality of data streams and a data structure generated using given data portions of the plurality of data streams;
  instructions for transforming the generated optimization problem into an optimization problem suitable for an optimization oracle;
  instructions for transmitting the transformed generated optimization problem to the optimization oracle;
  instructions for obtaining from the optimization oracle at least one solution of the transformed optimization problem;
  instructions for translating the at least one solution; and
  instructions for providing the translated at least one solution to thereby provide the real-time analytics on the plurality of data streams.

Clause 24. A non-transitory computer readable storage medium for storing computer-executable instructions which, when executed, cause a digital computer to perform a method for performing real-time analytics on a plurality of data streams, the method comprising:
 obtaining a plurality of data streams;
 accumulating real-time changes of the obtained plurality of data streams in a buffer unit to provide a buffered data portion;
 monitoring the buffered data portion for determining a calculation event, wherein the calculation event is based on a strategy based on observing given features in the buffered data portion;
 upon detection of the calculation event, generating an optimization problem indicative of the real-time analytics to be performed on one of given data portions of the plurality of data streams and a data structure generated using given data portions of the plurality of data streams;
 transforming the generated optimization problem into an optimization problem suitable for an optimization oracle;
 transmitting the transformed generated optimization problem to the optimization oracle;
 obtaining from the optimization oracle at least one solution of the transformed generated optimization problem;
 translating the at least one solution; and
 providing the translated at least one solution to thereby provide the real-time analytics on the plurality of data streams.

Clause 25. A method for performing real-time analytics on a plurality of data streams, the method comprising:
 obtaining a plurality of data streams;
 accumulating real-time changes of the obtained plurality of data streams in a buffer unit to provide a buffered data portion;
 monitoring the buffered data portion for determining a calculation event, wherein the calculation event is based on a strategy based on observing given features in the buffered data portion;
 upon detection of the calculation event, generating an optimization problem indicative of the real-time analytics to be performed on one of given data portions of the plurality of data streams and a data structure generated using given data portions of the plurality of data streams;
 transforming the generated optimization problem into an optimization problem suitable for an optimization oracle;
 providing the transformed generated optimization problem to the optimization oracle;
 obtaining at least one solution from the optimization oracle;
 translating the at least one solution; and providing the translated at least one solution to thereby provide the real-time analytics on the plurality of data streams.

Although the above description relates to a specific preferred embodiment as presently contemplated by the inventors, it will be understood that the invention in its broad aspect includes functional equivalents of the elements described herein.

The invention claimed is:

1. A method for performing real-time analytics on a plurality of data streams, the method comprising:
obtaining a plurality of data streams using a digital computer;
accumulating, using the digital computer, real-time changes of the obtained plurality of data streams in a buffer unit to provide a buffered data portion to compute a similarity and distance measure;
monitoring, using the digital computer, the buffered data portion for determining a calculation event, wherein the calculation event is based on a strategy based on observing given features in the buffered data portion;
upon detection of the calculation event, generating, using the digital computer, an optimization problem indicative of the real-time analytics to be performed on one of given data portions of the plurality of data streams and a data structure generated using given data portions of the plurality of data streams, wherein the data structure comprises a graph, wherein each node of the generated graph is associated with a data stream, and wherein each edge of the generated graph is representative of a respective similarity and distance measure between two respective given data portions of the data streams;
transforming, using the digital computer, the generated optimization problem into an optimization problem suitable for an optimization oracle;
solving the transformed generated optimization problem using the optimization oracle to provide at least one solution, translating, using the digital computer, the at least one solution; and
providing, using the digital computer, the translated at least one solution to thereby provide the real-time analytics on the plurality of data streams.

2. The method as claimed in claim 1, wherein the optimization oracle comprises a quantum annealer.

3. The method as claimed in claim 1, wherein the optimization oracle comprises a digital annealer.

4. The method as claimed in claim 1, wherein the optimization oracle comprises a coherent Ising machine.

5. The method as claimed in claim 1, wherein the plurality of data streams obtained comprise time series signals.

6. The method as claimed in claim 1, wherein the plurality of data streams is obtained from a corresponding plurality of data sources.

7. The method as claimed in claim 6, wherein each data source of the plurality of data sources is one of a real-time data source and a non-real-time data source.

8. The method as claimed in claim 7, wherein at least one of the plurality of data sources is located in the digital computer.

9. The method as claimed in claim 7, wherein at least one of the plurality of data sources is located in a remote digital computer operatively connected to the digital computer.

10. The method as claimed in claim 1, wherein the buffer unit is located in the digital computer.

11. The method as claimed in claim 1, wherein the optimization problem indicative of the real-time analytics to be performed is generated on a data structure; wherein the graph is generated using the given data portions of the plurality of data streams, and wherein the graph is generated in real-time using computations performed for previous data portions of the plurality of data streams.

12. The method as claimed in claim 11, wherein the plurality of data streams are real-valued data streams.

13. The method as claimed in claim 12, wherein the similarity and distance measure is selected from a group consisting of a Pearson correlation, a Cross correlation similarity calculated in time or frequency domain, a Correlation distance, a Pearson distance, a Covariance similarity, a Cosine similarity, an Angular semi-metric, an Orloci distance, a Similarity ratio, a Morisita-Horn similarity, a Spearman rank correlation, a Spearman footrule distance, a Kendal τ rank correlation, a Kendal τ distance, a Cook distance, a Fross correlation, an Euclidean distance, a L2 norm, a Binary Euclidean distance, a Mean censored Euclidean distance, a Manhattan distance, a L1 norm, a Penrose size distance, a Penrose shape distance, a Lorentzian distance, a Chebyshev distance, a L∞ norm, a power(p, r) distance, a weighted power(p, r) distance, a LP distance, a Normalized Lp distance, a Clark distance, a Meehl distance, a Hellinger distance, a Symmetric $x^2$ measure, a Symmetric $x^2$ distance, a Mahalanobis distance, a Minkowski distance, a Peak signal delay measure, a Time delay of arrival measure, an Absolute value of difference of peak of data, a Correlation of envelope of data, a Ruzicka similarity, a Roberts similarity, an Ellenberg similarity, a Gleason similarity, an Intersection distance, a Bray-Curtis distance, a Canberra distance, a Kulczynski similarities (1,2) and a Baroni-Urbani-Buser similarity.

14. The method as claimed in claim 11, wherein the plurality of data streams are binary-valued data streams.

15. The method as claimed in claim 14, wherein the similarity and distance measure is selected from a group consisting of a Hamann similarity, a Rand similarity, a Sokal-Mitchener similarity, a Sokal-Sneath similarities (1,2, 3), a Russel-Rao similarity, a Simpson similarity, a Braun-Blanquet similarity, a Roger-Tanimoto similarity, a Faith similarity, a Tversky similarity, a Gower-Legendre similarity, a Anderberg similarity, a Yule Q similarity, a Yule Y similarity of colligation, a Dispersion similarity, a Pearson φ similarity, a Gower similarity 2, a Pattern difference, a $Q_0$-difference, a Tanimoto similarity, a Tanimoto (biotope) distance, a Ochiai-Otuska similarity, a Jaccard similarity of community, a Motyka similarity, a Bray-Curtis similarity, a Dice similarity, a Czekanowsky-Dice distance.

16. The method as claimed in claim 12, further comprising using at least one selected threshold on each edge of the generated graph for providing a binarized graph; further wherein the optimization problem is generated using the binarized graph.

17. The method as claimed in claim 16, wherein two selected thresholds are used, further wherein the two selected thresholds comprise a fixed lower threshold value and a fixed upper threshold.

18. The method as claimed in claim 1, wherein the generated optimization problem is transformed into a quadratic unconstrained binary optimization problem.

19. The method as claimed in claim 1, wherein the solving of the transformed optimization problem is performed using the optimization oracle and at least one previous solution.

20. The method as claimed in claim 1, wherein the real-time analytics to be performed is selected from a group consisting of a graph coloring problem, a vertex cover problem, a maximum clique problem, a graph partitioning problem, a maximum independent set and a clique cover.

21. The method as claimed in claim 1, wherein the providing of the translated at least one solution comprises displaying the at least one translated solution to a user.

22. The method as claimed in claim 1, wherein the providing of the translated at least one solution comprises providing the at least one translated solution to a remote processing unit operatively coupled to the digital computer.

23. A digital computer comprising:
a central processing unit;
a display device;
a communication port for operatively connecting the digital computer to an optimization oracle comprising a quantum processor;
a memory unit comprising an application for performing real-time analytics on a plurality of data streams, the application comprising:
instructions for obtaining a plurality of data streams;
instructions for accumulating real-time changes of the obtained plurality of data streams in a buffer unit to provide a buffered data portion to compute a similarity and distance measure;
instructions for monitoring the buffered data portion for determining a calculation event, wherein the calculation event is based on a strategy based on observing given features in the buffered data portion;
instructions for generating, upon detection of the calculation event, an optimization problem indicative of the real-time analytics to be performed on one of given data portions of the plurality of data streams and a data structure generated using given data portions of the plurality of data streams, wherein the data structure comprises a graph, wherein each node of the generated graph is associated with a data stream, and wherein each edge of the generated graph is representative of a respective similarity and distance measure between two respective given data portions of the data streams;
instructions for transforming the generated optimization problem into an optimization problem suitable for an optimization oracle;
instructions for transmitting the transformed generated optimization problem to the optimization oracle;
instructions for obtaining from the optimization oracle at least one solution of the transformed optimization problem;
instructions for translating the at least one solution; and
instructions for providing the translated at least one solution to thereby provide the real-time analytics on the plurality of data streams.

24. A non-transitory computer readable storage medium for storing computer-executable instructions which, when executed, cause a digital computer to perform a method for performing real-time analytics on a plurality of data streams, the method comprising:
obtaining a plurality of data streams;
accumulating real-time changes of the obtained plurality of data streams in a buffer unit to provide a buffered data portion to compute a similarity and distance measure;
monitoring the buffered data portion for determining a calculation event, wherein the calculation event is based on a strategy based on observing given features in the buffered data portion;
upon detection of the calculation event, generating an optimization problem indicative of the real-time analytics to be performed on one of given data portions of the plurality of data streams and a data structure generated using given data portions of the plurality of data streams, wherein the data structure comprises a graph, wherein each node of the generated graph is associated with a data stream, and wherein each edge of the generated graph is representative of a respective similarity and distance measure between two respective given data portions of the data streams;
transforming the generated optimization problem into an optimization problem suitable for an optimization oracle;
transmitting the transformed generated optimization problem to the optimization oracle;
obtaining from the optimization oracle at least one solution of the transformed generated optimization problem;
translating the at least one solution; and
providing the translated at least one solution to thereby provide the real-time analytics on the plurality of data streams.

25. A method for performing real-time analytics on a plurality of data streams, the method comprising:
obtaining a plurality of data streams;
accumulating real-time changes of the obtained plurality of data streams in a buffer unit to provide a buffered data portion to compute a similarity and distance measure;
monitoring the buffered data portion for determining a calculation event, wherein the calculation event is based on a strategy based on observing given features in the buffered data portion;
upon detection of the calculation event, generating an optimization problem indicative of the real-time analytics to be performed on one of given data portions of the plurality of data streams and a data structure generated using given data portions of the plurality of data streams, wherein the data structure comprises a graph, wherein each node of the generated graph is associated with a data stream, and wherein each edge of the generated graph is representative of a respective similarity and distance measure between two respective given data portions of the data streams;
transforming the generated optimization problem into an optimization problem suitable for an optimization oracle;
providing the transformed generated optimization problem to the optimization oracle;
obtaining at least one solution from the optimization oracle; translating the at least one solution; and
providing the translated at least one solution to thereby provide the real-time analytics on the plurality of data streams.

* * * * *